Dec. 30, 1924.

G. W. HOUSE 1,521,100

WATER FILTER AND COOLER

Filed Sept. 24, 1921

Inventor
George W. House.
By Westall and Wallace
his attorneys

Patented Dec. 30, 1924.

1,521,100

UNITED STATES PATENT OFFICE.

GEORGE W. HOUSE, OF LONG BEACH, CALIFORNIA.

WATER FILTER AND COOLER.

Application filed September 24, 1921. Serial No. 502,957.

*To all whom it may concern:*

Be it known that I, GEORGE W. HOUSE, a citizen of the United States, resident of Long Beach, in the county of Los Angeles, State of California, have invented new and useful Improvements in a Water Filter and Cooler, of which the following is a specification.

This invention relates to a device for filtering water and then cooling the filtered water by evaporation. It is an object of this invention to provide a self contained filtering unit adapted to be inserted in a water container and through which the water must pass to the outlet. Another object of this invention is to provide certain details of structure for the filter whereby the water passes from the outside of the filter element through the wall and top thereof and into a closed chamber, following a tortuous pass through the receptacle to an outlet, the water in its travel encountering filtering agents.

Porous earthenware vessels are used in hot dry countries to cool water, the water percolating through the pores of the vessel to the outer surface where it evaporates. These vessels are known as ollas. It has been found that if a zone on the surface of the olla is permitted to become wet or moist and then to dry, that foreign substances from the atmosphere and water are deposited on the olla and that salts in solution are deposited and even moss or other agents in solution will form. This is detrimental to the appearance of the olla, and it is advantageous to keep the whole of the olla moist. It is a further object of this invention to provide an olla having means to keep substantially all the exposed outer wall of the olla moist, thereby increasing the efficiency of the olla and preventing the deposit of a coating upon any part of its wall.

Figure 1:
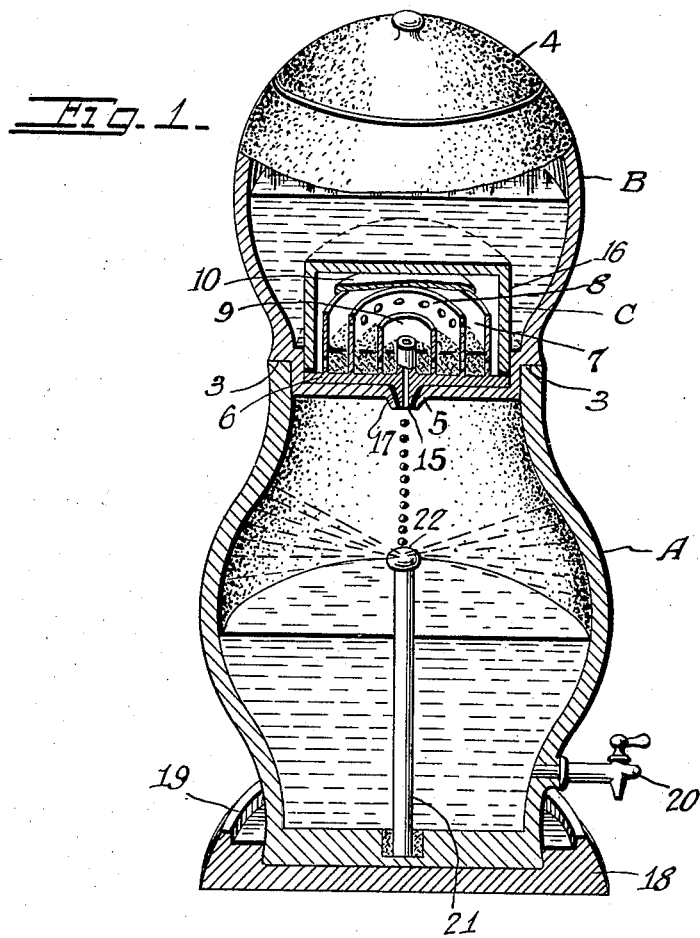
Figure 2:
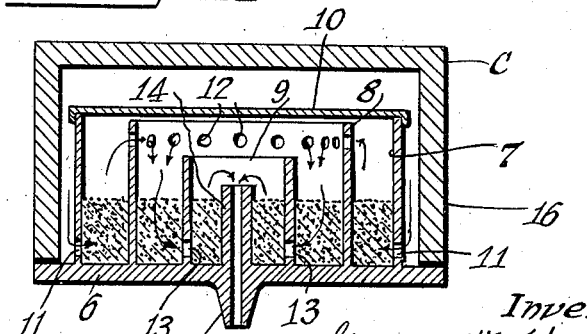

These objects together with other objects and corresponding accomplishments are obtained by means of the embodiment of my invention illustrated in the accompanying drawing, in which:

Fig. 1 is a perspective view in vertical section of a filter and cooler; and Fig. 2 is an enlarged vertical section through the filter element.

Referring more particularly to the drawing, A indicates an olla open at the top and provided with a detachable base at the bottom. Mounted upon the top of the olla is the water reservoir indicated by B and provided with a cover for access thereto. Disposed within the water reservoir is the filtering element indicated generally by C. This filtering element is more particularly shown in Fig. 2.

The reservoir B has a cylindrical portion at the bottom thereof of reduced diameter to fit within the top of the olla A. The reservoir rests on the shoulder 3. A bore 5 is formed at the center of the bottom of the reservoir to receive the nipple of the filtering element. A cover 4 is provided for the reservoir, this cover being large enough to permit insertion and removal of the filtering element.

The filtering element comprises a base 6 in the form of a disk. Formed on the base and upstanding therefrom are cylindrical walls 7, 8, and 9. These walls are preferably concentric and annular spaces are formed therebetween. Resting upon the top of wall 7 so as to close these annular spaces is a plate 10 of material impervious to water. Disk 6 and walls 7, 8, and 9 are preferably formed integral and of one piece of material and are also impervions to water. Porcelain is a preferred material. Adjacent the disk or base portion 6, the wall 7 has a series of holes 11 for the passage of water therethrough. Adjacent the top of wall 8 are a series of holes 12, and adjacent the bottom of wall 9 are a series of holes 13. Upstanding from the bottom of disk 6 is a tubular outlet 14 ending on the lower side in a nipple 15. Closing the filtering element is a cover 16. This cover is of a porous filtering material, the material being preferably of a ceramic character. The cover is cemented or otherwise secured to the base 6. The filtering element fits inside the recess at the bottom of the reservoir the nipple 15 extending through the bore in the bottom of the reservoir, a bushing 17 being preferably used to form a tight fit. The space between walls 7 and 8 is filled with a filtering agent, such as charcoal; the space between walls 8 and 9 is also filled with a filtering agent such as a mixture of charcoal and crushed granite; the space between tube 14 and wall 9 is filled with a filtering material such as granite. The spaces may be filled with any desired filtering material, those above specified being found advantageous for certain waters.

The reservoir B is filled with water, which passes through the cover 16 of the filtering element, thereby separating suspended matter from the water and otherwise acting upon materials in the water. Water will enter the space between the cover 16 and the wall 7, passing through the holes 11 into the bed of filter material, which in this instance has been described as charcoal. The water then passes upwardly through the holes 12 and down through the bed of filtering material in the space between walls 8 and 9. The granite contained in this filtering bed separates some of the charcoal which may have been carried along with the water, the water finally passing through holes 13 into the space between wall 9 and tube 14. In the passing of the water upwardly through this last mentioned bed, it is clarified and passes through the bore in tube 14 being discharged into the olla.

The olla A has a base 18 preferably separate and of non-porous material formed with a trough 19. Water is drawn from the olla by a faucet 20. At the center of the olla is a splash rod 21 ending in a spreader head 22. Rod 21 is preferably of porcelain, and has its head aligned with the bore in nipple 15 so that water will drop upon the head and splash. The water splashing impinges upon the sides of the olla above the water line, and partially rebounding fills the olla above the water line with spray, moistening the olla wall and running down over the inner surface. This causes a greater surface of the olla to be moist, and a resulting greater evaporation surface keeps the olla cooler. In addition to this the water running down over the surface of the olla to the body of water at the bottom thereof is brought in contact with the cool surface and is thus made cool by the time it reaches the body of water at the bottom. Thus, cool water is delivered to the body of water in the olla, whereas heretofore, cooling has been dependent upon the transfer of heat from the body of water to the walls of the olla due to convection.

Furthermore, this breaking up into minute particles resulting from the impingement of the water upon both splash rod and the walls of the olla above the water line not only thoroughly aerates the water, but keeps the air in the olla above the water line in a constant state of agitation, thus, tending to bring all particles of air into successive contact with the walls of the olla, thus thoroughly cooling the air.

What I claim is:

A self contained filtering element comprising a plate impervious to water having upstanding therefrom walls forming channels nesting one within another, the outer wall being spaced from the periphery of said plate, said channel communicating by openings such that the flow of water therethrough is undulating, filtering material in said channels, a disk of impervious material disposed over said channels and spanning the outer wall, and a cover of inverted cup form enclosing said channels and mounted upon said plate, said cover being formed of filtering material.

In witness that I claim the foregoing I have hereunto subscribed my name this 13 day of September, 1921.

GEORGE W. HOUSE.